(No Model.)

W. N. & J. B. CLARK & W. N. CLARK, Jr.
DUST PAN.

No. 258,631. Patented May 30, 1882.

Witnesses.
Edwin F. Dimock,
Chas. L. Burdett

Inventors.
William N. Clark
James B. Clark
William N. Clark Jr.
By Theo. G. Ellis, attorney.

United States Patent Office.

WILLIAM N. CLARK, JAMES B. CLARK, AND WILLIAM N. CLARK, JR., OF CHESTER, CONNECTICUT.

DUST-PAN.

SPECIFICATION forming part of Letters Patent No. 258,631, dated May 30, 1882.

Application filed April 24, 1882. (No model.)

*To all whom it may concern:*

Be it known that we, WILLIAM N. CLARK, JAMES B. CLARK, and WILLIAM N. CLARK, Jr., of Chester, in the county of Middlesex and State of Connecticut, have invented certain new and useful Improvements in Dust-Pans; and we do hereby declare that the following is a full, clear, and exact description thereof, whereby a person skilled in the art can make and use the same, reference being had to the accompanying drawings, and to the letters of reference marked thereon.

Like letters in the figures indicate the same parts.

Our improvement relates to dust-pans intended as a household implement into which dirt and dust are swept to be carried away.

The object of our improvement is to provide a covered receptacle in the dust-pan which can hold the dust, when swept into it, so that it cannot fall out or be blown away accidentally.

Figure 1:
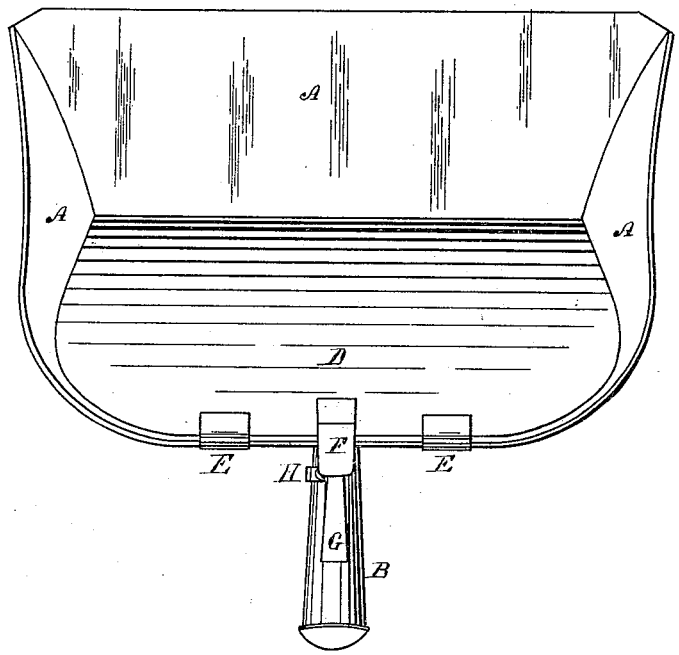
Figure 2:
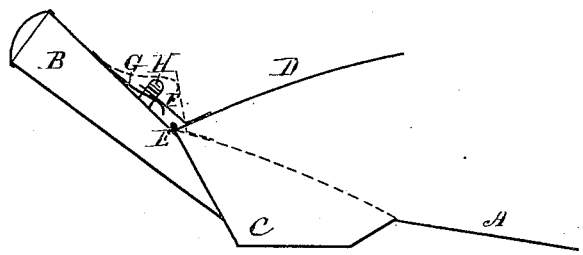

In the accompanying drawings, illustrating our invention, Figure 1 is a top view of our improved dust-pan. Fig. 2 is a section through the middle of the pan and handle, showing more particularly the dust-receptacle and cover. In Fig. 1 the cover is down and the receptacle closed, and in Fig. 2 the cover is raised and the receptacle open.

A is the pan, made of the ordinary form and in the customary manner, except as will be described.

B is the handle, attached to the rear side of the pan.

C is a dust-receptacle, which may be more or less depressed below the ordinary bottom of the pan A. It is desirable to have it of sufficient depth so that the cover D may close perfectly without coming in contact with the contents.

D is the cover to the receptacle C. It is hinged to the rear edge of the pan A by the hinges E, which permit its forward edge to be easily raised.

F is a thumb-piece attached to the cover D, by depressing which the cover can be raised.

G is a spring attached to the handle B and acting upward against the thumb-piece F. This spring holds the cover closed unless it is intentionally raised.

H is a latch, which is intended to be made of spring metal, which catches and holds the thumb-piece F when it is depressed, and thus holds the cover up until the latch is released. Its top is intended to project above the piece F when latched, so that it can be released by a side motion of the thumb. The lower end of the latch is attached to the handle B.

The operation of our invention is as follows: When it is desired to use the dust-pan the cover is raised by pressing down the piece F, which catches on the latch H. The dust is then swept into the receptacle C in the ordinary manner. The latch H is then released, when the cover closes by its own weight and by the pressure of the spring G, and is held closed by the spring until the cover is opened, as before described, to discharge the contents of the pan.

It is also obvious that our invention can be used without the spring G or the latch H by simply holding down the thumb-piece F by the thumb while the dust-pan is in use, and releasing it to inclose and hold the sweepings.

What we claim as our invention is—

1. In combination with the pan A, provided with the receptacle C and the handle B, the hinged cover D, provided with the thumb-piece F, extending back toward the handle, substantially as described.

2. In combination with the pan A and the handle B, the hinged cover D, the thumb-piece F, attached to said cover, the spring G, and the latch H, substantially as described.

WILLIAM N. CLARK.
JAMES B. CLARK.
WILLIAM N. CLARK, JR.

Witnesses:
WM. H. SULLIVAN,
E. C. HUNGERFORD.